United States Patent [19]

Nagano

[11] 4,237,743
[45] Dec. 9, 1980

[54] FRONT DERAILLEUR FOR A BICYCLE

[75] Inventor: Masashi Nagano, Sakai, Japan

[73] Assignee: Shimano Industrial Company, Limited, Osaka, Japan

[21] Appl. No.: 947,818

[22] Filed: Oct. 2, 1978

[30] Foreign Application Priority Data

Oct. 11, 1977 [JP] Japan ................................ 52/122148
Oct. 11, 1977 [JP] Japan ........................ 52/136671[U]

[51] Int. Cl.³ ............................................ F16H 7/18
[52] U.S. Cl. .............................. 474/82/144; 474/140
[58] Field of Search ............................. 74/217 B, 611

[56] References Cited

U.S. PATENT DOCUMENTS

| 3,813,955 | 6/1974 | Huret et al. ........................ 74/217 B |
| 3,890,847 | 6/1975 | Dian .................................. 74/217 B |
| 4,030,374 | 6/1977 | Isobe ................................. 74/217 B |

FOREIGN PATENT DOCUMENTS

965419 2/1950 France .
1026010 1/1953 France .
59098 12/1953 France .

Primary Examiner—C. J. Husar
Assistant Examiner—Conrad Berman
Attorney, Agent, or Firm—Stevens, Davis, Miller & Mosher

[57] ABSTRACT

A front derailleur for a bicycle is of the link type and comprises four members of a fixing member, two linkage members and a movable member, one of the four members carrying a chain guard for preventing a driving chain from coming off a front gear. The chain guard comprises a mounting plate for mounting to one of the four members and at least one guard plate for preventing the chain from coming off of the gear.

8 Claims, 14 Drawing Figures

FRONT DERAILLEUR FOR A BICYCLE

This invention relates to a front derailleur for a bicycle, and more particularly to a front derailleur for switching a driving chain to a specific front gear.

Generally, this kind of front derailleur comprises a fixing member fixed to a seat tube of the bicycle through a tightening band, two linkage members, a movable member supported rotatably thereto, and a chain guide, the chain guide being mounted to the movable member and shifted through movement thereof between a high speed front gear and a low speed one, thereby switching a driving chain to a selected front gear for changing the bicycle speed.

In this instance, when being moved axially of the front gears, especially from the high speed front gear to the low speed one, the chain cannot be accurately meshed with the front gear by abruptly operating the derailleur in haste or by side way movement of the chain, resulting in the chain riding over the teeth of the lower speed gear and often coming off the gear Therefore, a chain guide is conventionally provided at the front gear or at a bracket lug of the bicycle, thereby preventing the chain from coming off of the gear when changing the speed.

The chain guide, however, is mounted independently of the front derailleur thereby increasing the time and labour to assemble the bicycle. Furthermore, the chain guard is mounted at the outer periphery of the front gear along side the teeth thereof, or radially outward from the gear from the bracket lug, thereby resulting in a larger size which increases production costs.

In view of the aforesaid problem, the invention has been designed. An object of the invention is to provide a front derailleur whose chain guide need not be separately mounted in assembly with the bicycle and is also small in size.

In detail, the front derailleur of the invention is of a link type and comprises four members of a fixing member, two linkage members and a movable member having a chain guide, one of the four members carrying a chain guard. The chain guard comprises a mounting plate for mounting to one of the four members, and at least one guard plate for preventing the chain from coming off the gear. The guard plates extend ahead of the chain guide in the forward travelling direction of the chain, positioned axially outward from the low speed front gear, i.e., reversely to the high speed front gear, and opposite the low speed gear at an interval smaller than the width of the chain.

Since the chain guard is included with the front derailleur mounted to a seat tube through the fixing member, there is no need for the chain guard to be mounted to the front gear or bracket lug independently of the derailleur. Furthermore, with the chain guard incorporated with the front derailleur. Furthermore, with the chain guard incorporated with the front derailleur small-sized chain guard plates may be used and the chain is reliably prevented by the chain guard from coming off the multi-speed front gears.

These and other objects and features of the invention will be more apparent from the following description in accordance with the accompanying drawings.

The front derailleur of the invention mainly comprises four members of a fixing member 1 fixed to a seat tube F of the bicycle, a pair of linkage members 4 and 5 pivoted to the fixing member 1 through pivot pins 2 and 3, a movable member 8 pivoted to the linkage members 4 and 5 through pivot pins 6 and 7, and a chain guide 9 fixed to the movable member 8.

The fixing member 1 is fixed to the seat tube F by tightening means 12 comprising a tightening band 11 and a bolt and nut therefor.

The linkage members 4 and 5 have at both lengthwise ends bores through which pivot pins 2 and 3 and pivot pins 6 and 7 are inserted respectively, and are arranged in parallel to connect the fixing member 1 with the movable member 8, thereby moving in parallel motion to shift the movable member 8 in parallel with respect to the fixing member 1.

The chain guide 9, as is well-known, comprises elongated guide plates 9a and 9b opposite to each other at an interval larger than the width of the chain, and a plate 9c connecting both the guide plates 9a and 9b at the upper ends thereof, the guide plate 9b being inwardly positioned and fixed to the movable member 8. The chain guide 9 also reciprocates with the movable member 8 between the low speed gear $G_1$ and the high speed one $G_2$, which are rotatably supported through a crank shaft (not shown) to a bracket lug (not shown) at the lower end of the seat tube F.

A return spring 13 is inserted between the one linkage member 4 and the movable member 8. The return spring 13 is supported to the pivot pin 6 and is engaged at one end with the one linkage member 4 and at the other end with the movable member 8, thereby returning the movable member 8 toward the low speed gear $G_1$ from the high speed one $G_2$ at a side of the seat tube F.

The front derailleur according to the foregoing has a chain guard 20 mounted to one of the aforesaid four members. The chain guard 20 prevents a driving chain C from coming off each of the front gears and is mounted to the movable member 8 as shown in FIGS. 1 through 6, or to the fixing member 1 as shown in FIGS. 7 through 14. In the former case, the chain guard 20 is mounted to be movable in the direction of the shifting of chain guide 9.

A typical embodiment of the front derailleur, in which the chain guard 20 is mounted to the movable member 8, will be explained in accordance with FIGS. 1 through 6.

Figure 1:
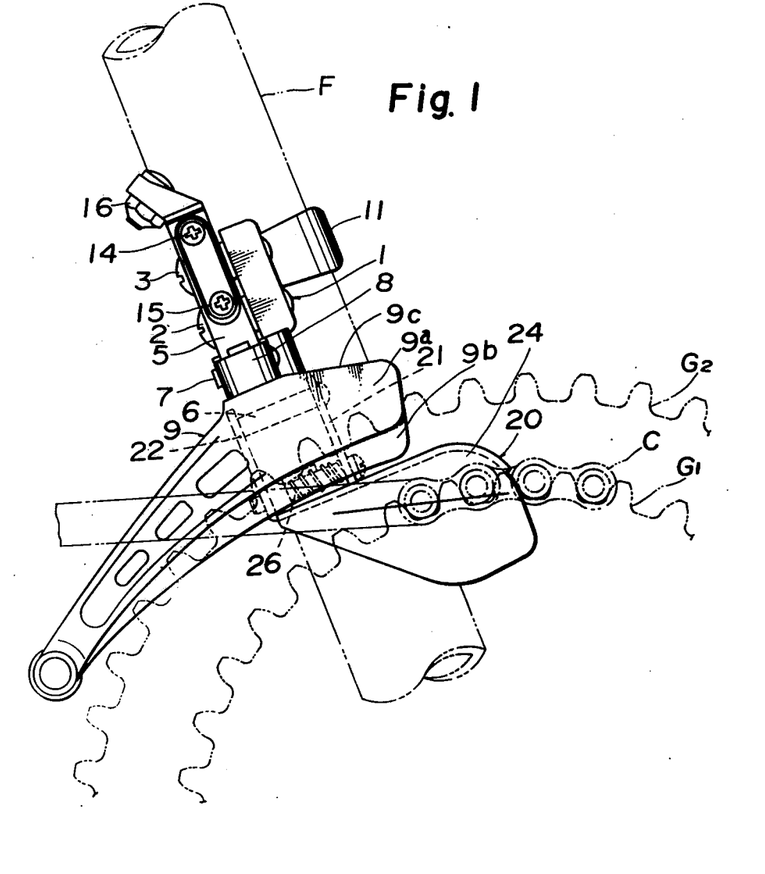
FIG. 1 is a side view of a typical embodiment of a front derailleur of the invention.

The chain guard 20 in the embodiment shown comprises a substantially U-like shaped mounting plate of opposite walls 21 and 22 and of a bottom 23, and a guard plate 24 extending therefrom and opposite to one side of one of the multi-speed front gears. The walls 21 and 22 sandwich the movable member 8 axially of the pin 6 and are mounted to the movable member 8 swingably around the pivot pin 6 as shown in the drawings. The guard plate 24, as shown in FIG. 1, extends ahead of the chain guide 9 toward the chain travelling direction, and opposite to the outside of the teeth of the low speed gear $G_1$ of a minimum diameter, i.e., the side reverse to the high speed gear $G_2$ of a maximum diameter at an interval smaller than width of the chain C.

Figure 4:
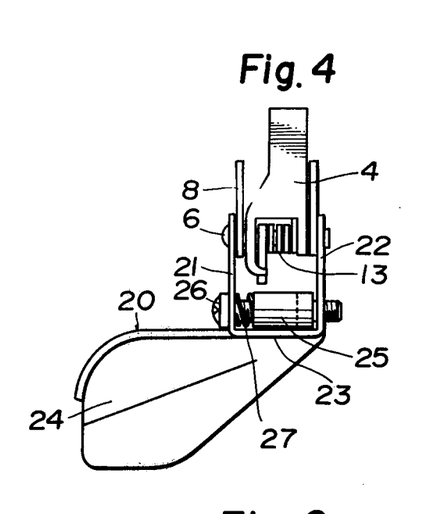
FIG. 4 is a partially side view of the front derailleur in FIG. 1.

The chain guard 20, which is swingably supported to the pivot pin 6, is controlled in its swinging motion apart from the low speed gear $G_1$ by means of a stopper 25. The stopper 25 contacts with the seat tube F to restrict the movement of chain guard 20, which may be fixed to the walls 21 and 22 at the chain guard 20, but is, as shown in FIGS. 4 and 5, preferable supported through a spring 27 to an adjustment screw 26 screwably mounted between the walls 21 and 22, so that the screw 26 adjusts the tip of stopper 25 projecting from the wall 22.

Figure 5:
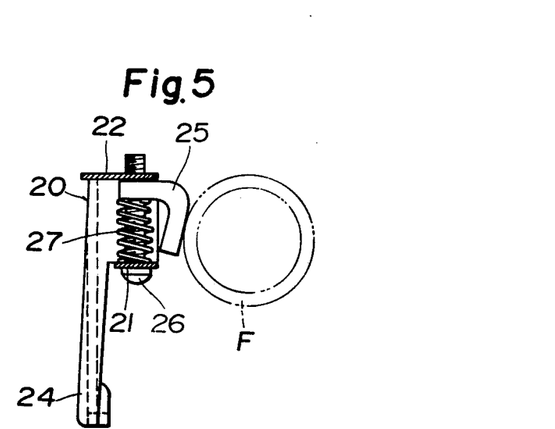
FIG. 5 is a sectional view taken on Line V—V in FIG. 2.

The stopper 25 is also substantially L-like shaped in section, projects from the walls 21 and 22 and is bent slantwise toward the pivot 6 as shown in FIG. 5, whereby the slant face abuts against the seat tube F by controlling the adjustment screw 26 so that the abutment may be changed to adjust an interval between the guard plate 24 and the low speed gear $G_1$.

Figures 2, 3:
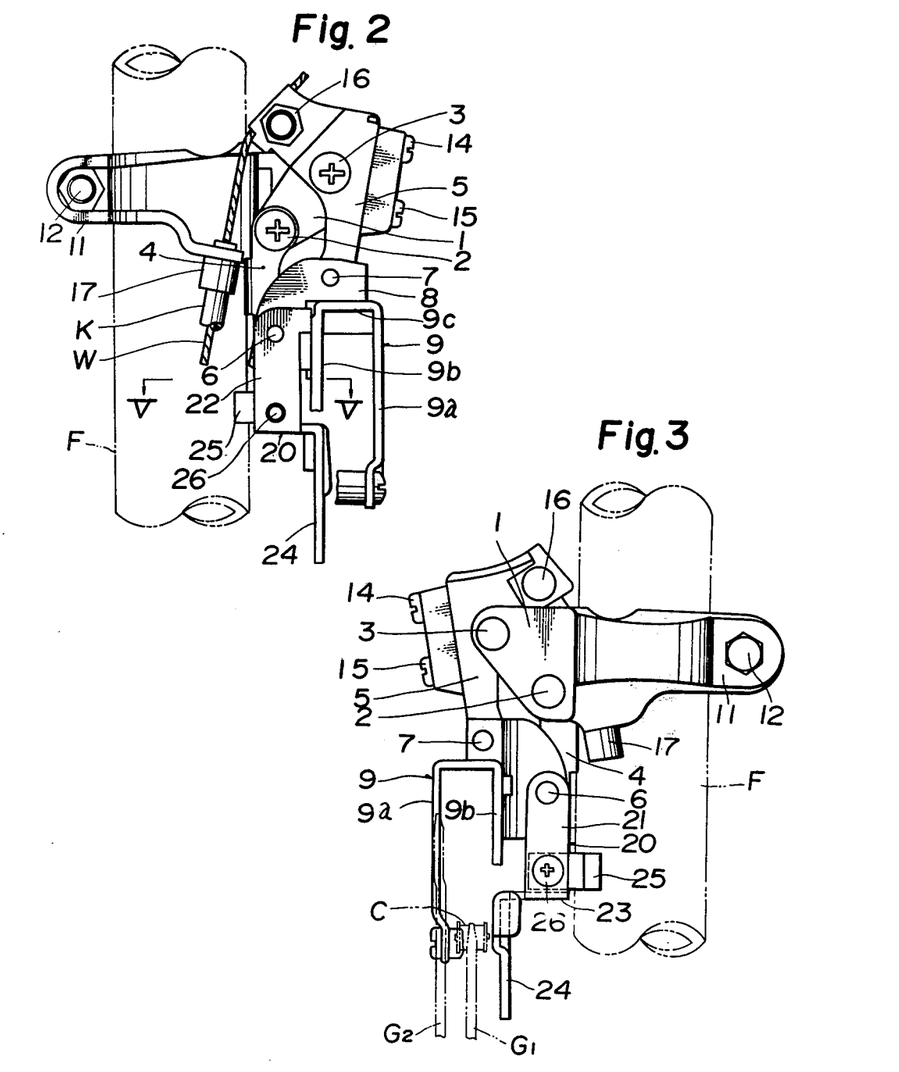
FIG. 2 is a rear view thereof, in which the chain guide is partially omitted.
FIG. 3 is a front view of the front derailleur in FIG. 1, in which the chain guide is partially omitted.
Figure 6:
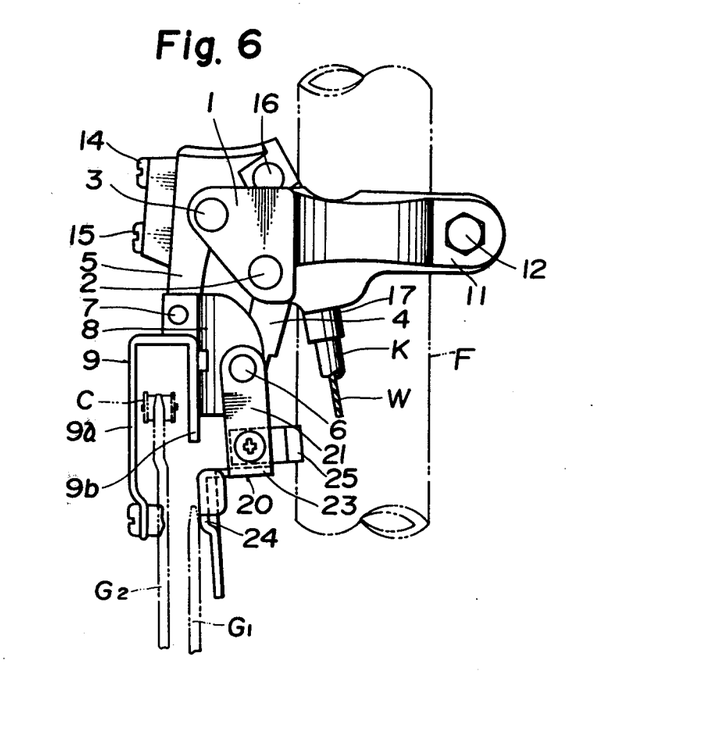
FIG. 6 is an illustration of shifting the chain guide.

Hence, when the chain guide 9 is shifted toward the low speed gear $G_1$ as shown in FIG. 3, the stopper 25 abuts at its slant face against the seat tube F to restrain the chain guard 20 from further movement, thereby keeping constant the interval between the guard plate 24 and the low speed gear $G_1$. On the other hand, when shifted toward the high speed gear $G_2$ as shown in FIG. 6, the chain guard 20 abuts at its guard plate 24 against the outside of the teeth of low speed gear $G_1$, thereby being restrained from further movement. In this instance, frictional resistance created between the guard plate 24 and the low speed gear $G_1$ does not affect rotation thereof because of the swingable construction of the chain guard 20 as described above. In addition, the frictional resistance is eliminated by providing a spring less resilient than the return spring 13 between the chain guard 20 and the movable member 8 or chain guide 9, in order that the chain guard swings away from the low speed gear $G_1$ when shifting the chain guide toward the high speed gear $G_2$.

In the drawings, the reference numerals 14 and 15 designate adjustment screws mounted to the other linkage member 5; 16, a retainer provided at one end of the linkage member 5 and holding one end of a control wire W; and 17, a retainer provided at the fixing member 1 and holding a terminal of an outer sheath K.

The aforegoing front derailleur including the chain guard 20 is mounted to the seat tube F through the tightening band 11. When the control wire W is pulled to move the movable member 8 of the front derailleur to shift the chain guide 9 to switch the chain C from the low speed gear $G_1$ to the high speed one $G_2$, the chain guard 20 contacts at its guard plate 24 with the lateral side of the teeth of low speed gear $G_1$, thereby being restrained from further movement over the high speed gear $G_2$.

On the other hand, when the control wire W is released the return spring 13 by which the movable member 8 moves the chain guide 9 from the high speed position to the low, the slant face of the L-like shaped stopper 25 abuts against the seat tube F to stop the movement of chain guard 20, whose guard plate 24 is regularly spaced from the teeth of the low speed gear $G_1$, thereby reliably preventing the chain C from riding over the teeth of the gear $G_1$ and falling off.

Incidentally, the chain guard 20 in the aforesaid embodiment may be provided at a side of the high speed gear or at sides of both the high and low speed gears.

Next, another typical embodiment, in which the chain guard 20 is mounted to the fixing member 1, will be explained in accordance with FIGS. 7 through 14.

In this embodiment, the chain guard 20 comprises a mounting plate 210 and first and second guard plates 241 and 242 integrated with each other. The first and second guard plates 241 and 242 are spaced at an interval larger than that between the outside surfaces of the low and high speed gears $G_1$ and $G_2$, the first guard plate 241 being opposite to the outside of the gear $G_1$ and the second guard plate 242 opposite to that of the gear $G_2$ at intervals smaller than the width of the chain C, respectively.

Figure 7:
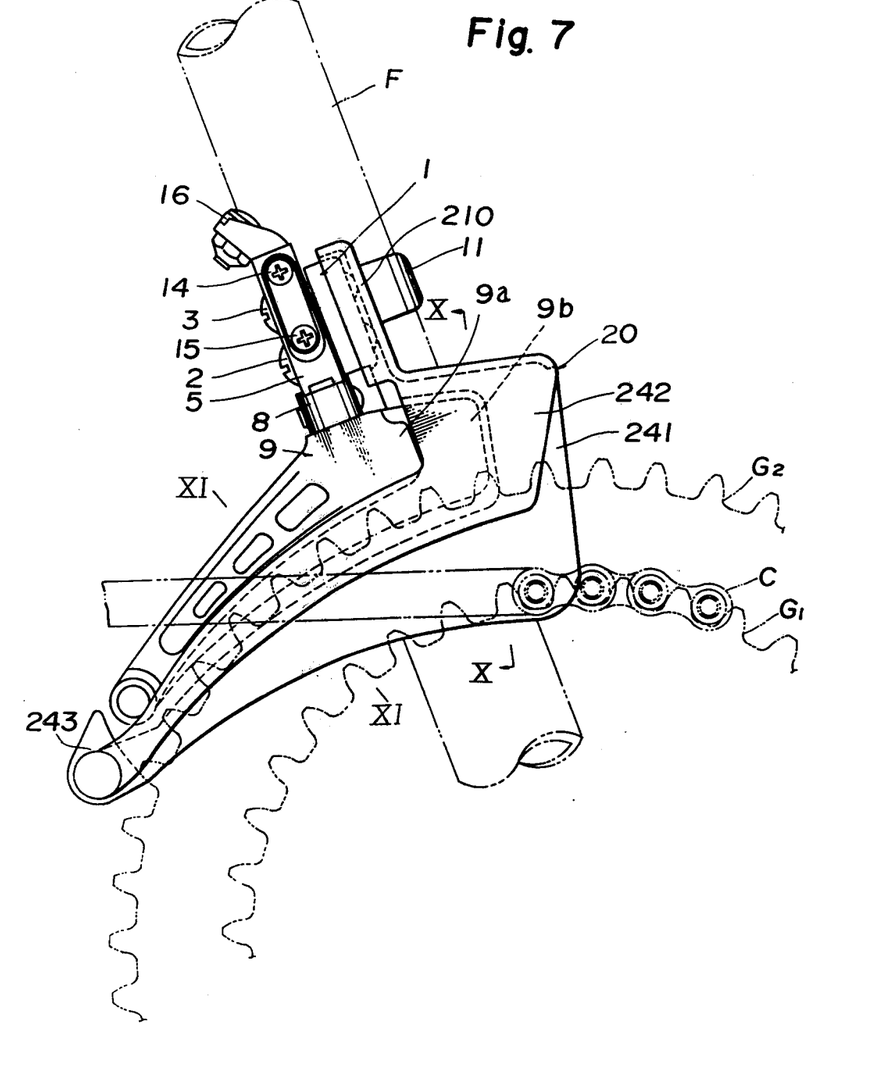
FIG. 7 is a side view of a modified embodiment of the invention.

Referring to FIG. 7, the first and second guard plates 241 and 242 extend ahead of the chain guide 9 in the direction of the forward travelling chains and rearwardly of the chain guide 9 along the lower edges of guide plates 9a and 9b, the rearward extensions being connected at the utmost ends thereof by a connector 243, thereby preventing deformation of the guard plates. The chain guard 20 may be formed in a vane-like shape as shown in FIGS. 1 through 6, but it is advantageous for ensuring removal of the chain from the gear that the chain guard 20 extends rearwardly as aforegoing.

Figures 11, 12:
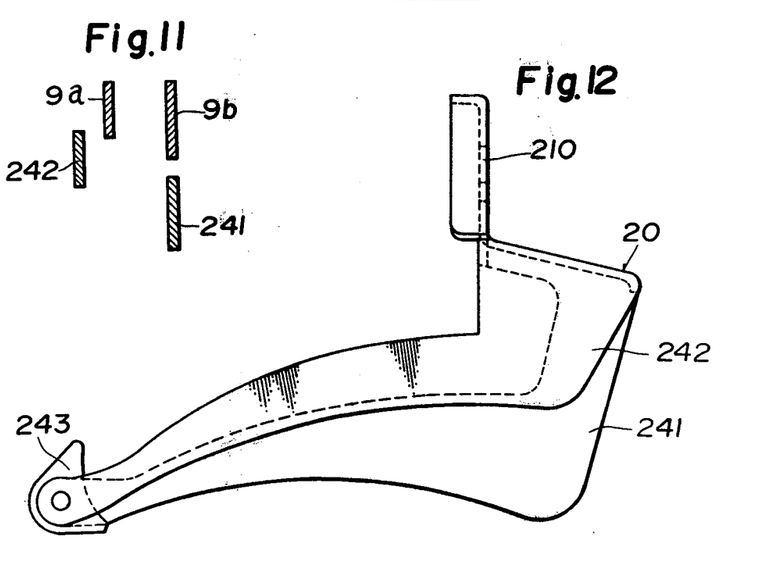
FIG. 11 is a sectional view taken on Line XI—XI in FIG. 7, showing the chain guide and guard plates in section.
FIG. 12 is a side view of the chain guard.
Figure 13:
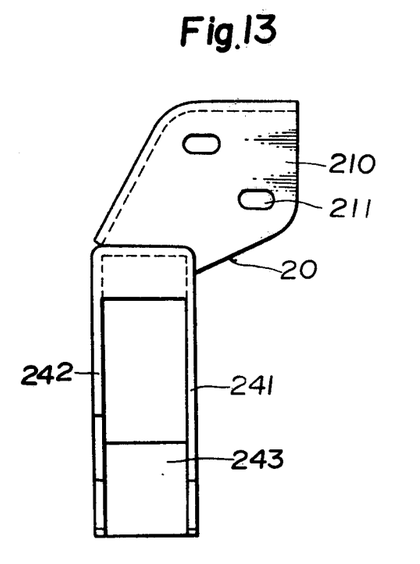
FIG. 13 is a front view thereof.

The chain guard 20 in this embodiment is fixed to the fixing member 1 in such a manner that the inner surface of the mounting plate 210 abuts against the front surface of the fixing member 1 in the forward direction of the bicycle and is screwably attached through the pivot pins 2 and 3. The mounting plate 210 is bent upright at a part of the side edge thereof as shown in FIGS. 12 and 13, thereby increasing the strength of the plate. Bores 211 through which the pins 2 and 3 are inserted are, as shown in FIG. 3, elongated to adjust the chain guard 20 position with respect to the fixing member 1.

In addition, the chain guard 20 may be fixed to the fixing member 1 by set screws or welding in place of the aforesaid pivot pins 2 and 3.

The front derailleur including the chain guard 20, as described above, is mounted to the seat tube F through the tightening band 11. When the control wire W is pulled to control the derailleur, the movable member 8 swings to shift the chain guide 9 from the low speed gear $G_1$ to the high speed gear $G_2$. In this instance, even though the chain C tends to ride over the high speed gear's teeth, the second guard plate 242 reliably restricts the chain C from further movement as shown in FIG. 14.

Figures 8, 9:
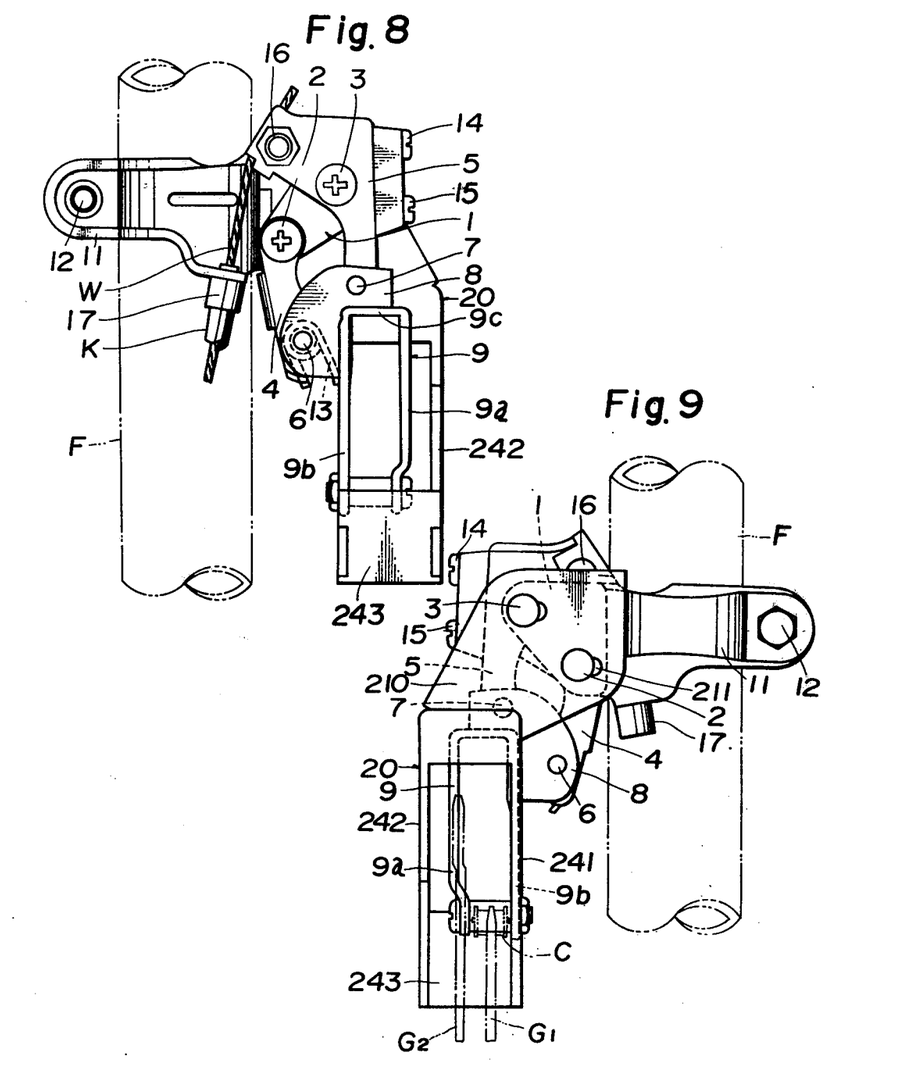
FIG. 8 is a rear view thereof.
FIG. 9 is a front view of the front derailleur in FIG. 7.
Figure 10:
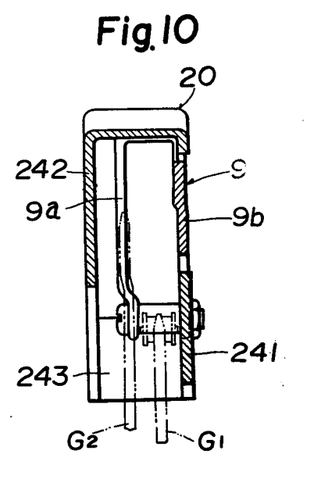
FIG. 10 is a sectional view taken on Line X—X in FIG. 7.
Figure 14:
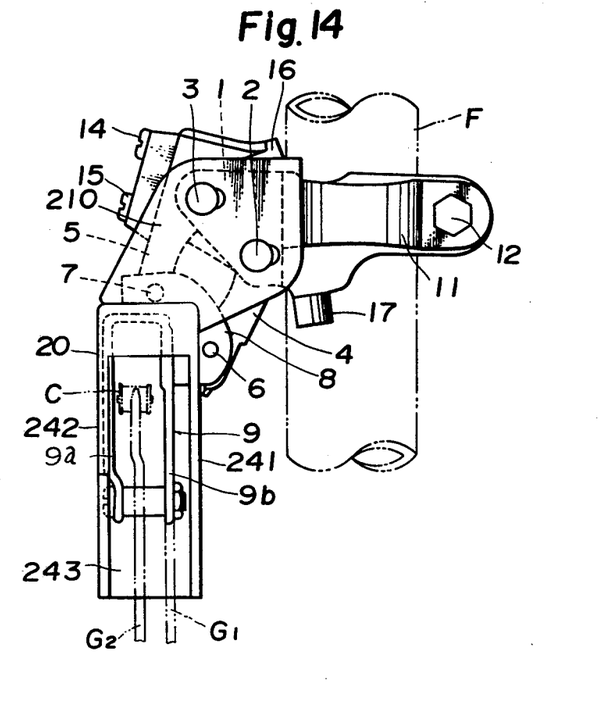
FIG. 14 is an illustration of shifting the chain guide from the position shown in FIG. 9.

On the other hand, when the chain C carried on the gear $G_2$ as shown in FIG. 14 is switched to the low speed gear $G_1$ as shown in FIG. 9, the control wire W is released to actuate the return spring 13 to swing the movable member 8, thereby moving the chain guide 9 toward the low speed gear $G_1$. In this instance, even though the chain C tends to ride over the low speed gear $G_1$, the first guard plate 241 reliably restricts the chain C from further movement as shown in FIG. 9.

In addition, in the aforesaid embodiment, the two guard plates 241 and 242 at the chain guard 20 may be reduced by one.

As clearly understood from the aforesaid description, the chain guard mounted to one of the four members constituting the front derailleur, can save the work of independently mounting the chain guard, thereby facilitating and simplifying assembly of the bicycle to that extent. Furthermore, the chain guard mounted to the front derailleur arranged near the teeth of multi-speed front gears can be smaller sized in comparison with the conventional derailleur having the chain guard mounted to the front gear or bracket lug, thereby reducing production costs.

The chain guard is formed of a mounting plate attached to one of the four members and of at least one guard plate, the guard plates extending ahead of the chain guide and being opposite to at least the low speed gear of smaller diameter at an interval smaller than the width of the chain, so that the chain guard, even if small in size, can reliably prevent the chain from coming off the front gear when changing the speed, thereby always allowing the chain to mesh exactly with the gear.

As many apparently widely different embodiments of this invention may be made without departing from the spirit and scope thereof, it is to be understood that the invention is not limited to the specific embodiments thereof except as defined in the appended claims.

What is claimed is:

1. A front derailleur for a bicycle, through which a driving chain is switched to one of multi-stage front gears, said front derailleur including:
   four members comprising a fixing member, two linkage members pivoted to said fixing member, and a movable member pivoted to said two linkage members and movable through said two linkage members in parallel with respect to said fixing member; and
   a chain guide fixed to said movable member and movable therewith for guiding said driving chain to one of said front gears; one of said four members having a chain guard for preventing said chain from coming off one of said front gears, said chain guard comprising a mounting plate for mounting with said one of the four members and at least one guard plate for preventing said chain from coming off one of said front gears, said guard plate extending ahead of said chain guide in the forward travelling direction of said chain and being positioned at the lateral side of a low speed gear of a minimum diameter reverse to a high speed gear of a maximum diameter among said front gears, so as to be opposite said low speed front gear at an interval smaller than the width of said chain.

2. The front derailleur for the bicycle according to claim 1, wherein said chain guard is mounted to said movable member of said four members in relation of being swingable in the direction of movement of said chain guide.

3. The front derailleur for the bicycle according to claim 2, wherein said chain guard includes a stopper for restricting the swinging motion of said chain guard with respect to said low speed front gear.

4. The front derailleur for the bicycle according to claim 3, wherein said chain guard has an adjustment screw carrying therewith said stopper, said adjustment screw being controlled to adjust the chain guard position apart from said low speed front gear.

5. The front derailleur for the bicycle according to claim 2, wherein said mounting plate at said chain guard is substantially U-shaped, said guard plates at said chain guard extend from the bottom of said mounting plate integrally therewith and are vane-like shaped respectively, and said mounting plate is pivoted to said linkage members through pins pivotally supporting therewith and movable member.

6. A front derailleur for a bicycle, through which a driving chain is switched to one of multi-stage front gears, said front derailleur including:
   four members comprising a fixing member, two linkage members pivoted to said fixing member, and a movable member pivoted to said two linkage members and movable through said two linkage members in parallel with respect to said fixing member; and
   a chain guide fixed to said movable member and movable therewith for guiding said driving chain to one of said front gears; said fixing member having a chain guard for preventing said chain from coming off one of said front gears, said chain guard comprising a mounting plate for mounting with said fixing member and at least one guard plate for preventing said chain from coming off one of said front gears, said guard plate extending ahead of said chain guide in the forward travelling direction of said chain and being positioned at the lateral side of a low speed gear of a minimum diameter reverse to a high speed gear of a maximum diameter among said front gears, so as to be opposite said low speed front gear at an interval smaller than the width of said chain.

7. The front derailleur for the bicycle according to claim 6, wherein said chain guard has a first and a second guard plate, said first and second guard plates being spaced at an interval larger than the interval between the outsides of said high speed front gear of the maximum diameter and said low speed gear of the minimum diameter, said first guard plate being opposite to the outside of said low speed front gear at an interval smaller than the width of said chain, said second guard plate being opposite to the outside of said high speed front gear at the interval smaller than the width of said chain.

8. The front derailleur for the bicycle according to claim 7, wherein said first and second guard plates extend at the front ends ahead of said chain guide toward said chains forward travelling direction and at the rear ends rearwardly of said chain guide along lower edges thereof respectively.

* * * * *